United States Patent
Sharma

(10) Patent No.: US 12,471,914 B2
(45) Date of Patent: Nov. 18, 2025

(54) CONTROL ASSEMBLIES FOR MEDICAL DEVICES AND RELATED METHODS OF USE

(71) Applicant: Boston Scientific Medical Device Limited, Galway (IE)

(72) Inventor: Deepak Kumar Sharma, Muzaffarnagar (IN)

(73) Assignee: Boston Scientific Medical Device Limited, Galway (IE)

( * ) Notice: Subject to any disclaimer, the term of this patent is extended or adjusted under 35 U.S.C. 154(b) by 79 days.

(21) Appl. No.: 18/302,031

(22) Filed: Apr. 18, 2023

(65) Prior Publication Data

US 2023/0329707 A1    Oct. 19, 2023

Related U.S. Application Data

(60) Provisional application No. 63/332,578, filed on Apr. 19, 2022.

(51) Int. Cl.
*A61B 17/072* (2006.01)
*A61B 17/00* (2006.01)

(52) U.S. Cl.
CPC .... *A61B 17/072* (2013.01); *A61B 2017/0046* (2013.01)

(58) Field of Classification Search
CPC . A61B 2034/2061; A61B 34/20; A61B 34/30; A61B 1/0052; A61B 2017/00017; A61G 13/04; A61G 13/08
See application file for complete search history.

(56) References Cited

U.S. PATENT DOCUMENTS

| | | | |
|---|---|---|---|
| 6,626,832 B1 | 9/2003 | Paltieli et al. | |
| 8,064,985 B2 * | 11/2011 | Peterson | A61B 90/00 606/130 |
| 9,161,817 B2 * | 10/2015 | Olson | A61B 34/77 |
| 9,456,843 B2 * | 10/2016 | Kessler | A61B 17/320758 |
| 9,636,040 B2 * | 5/2017 | Duindam | A61B 17/3209 |
| 9,757,034 B2 * | 9/2017 | Desjardins | A61B 90/98 |
| 10,238,370 B2 * | 3/2019 | Park | A61B 10/0266 |
| 10,376,321 B2 * | 8/2019 | DiMaio | A61B 34/20 |

(Continued)

FOREIGN PATENT DOCUMENTS

| JP | H06217928 A | 8/1994 | |
|---|---|---|---|
| WO | WO-2012063880 A1 * | 5/2012 | A61B 1/0016 |

OTHER PUBLICATIONS

International Search Report and Written Opinion issued in International Application No. PCT/IB2023/053960, issued Jul. 7, 2023 (10 pages).

*Primary Examiner* — Dariush Seif
(74) *Attorney, Agent, or Firm* — Bookoff McAndrews, PLLC

(57) ABSTRACT

A medical assembly that includes a medical device including a handle having an actuator, a shaft extending distally from the handle, and a sensor at a distal end of the shaft. The distal end of the shaft is coupled to the actuator by a wire extending through the shaft, and the sensor is configured to measure data indicative of the distal end of the shaft moving from a first position to a second position. The actuator is configured to articulate the distal end of the shaft based on the data measured by the sensor to move the distal end from the second position to the first position.

20 Claims, 11 Drawing Sheets

(56) References Cited

U.S. PATENT DOCUMENTS

| | | | |
|---|---|---|---|
| 10,820,947 B2 * | 11/2020 | Julian | A61B 34/32 |
| 10,881,280 B2 * | 1/2021 | Baez, Jr. | A61B 1/0053 |
| 11,000,265 B1 * | 5/2021 | Ryu | A61B 34/20 |
| 11,039,736 B2 * | 6/2021 | Laby | A61B 1/0055 |
| 11,331,797 B2 * | 5/2022 | Takagi | A61B 34/71 |
| 11,717,644 B2 * | 8/2023 | Douglas | A61M 25/0136 604/95.01 |
| 2003/0212394 A1 * | 11/2003 | Pearson | A61B 18/1477 606/41 |
| 2005/0250983 A1 * | 11/2005 | Tremaglio | A61B 17/221 600/101 |
| 2009/0076476 A1 * | 3/2009 | Barbagli | A61B 5/283 600/587 |
| 2009/0318003 A1 * | 12/2009 | Hossack | A61B 8/445 439/299 |
| 2010/0022950 A1 * | 1/2010 | Anderson | A61B 1/00114 604/100.01 |
| 2010/0069719 A1 * | 3/2010 | Wehrheim | G02B 23/2476 600/152 |
| 2011/0054252 A1 * | 3/2011 | Ozaki | A61B 1/00165 600/109 |
| 2012/0160784 A1 * | 6/2012 | Hashizume | A61B 34/30 211/1.51 |
| 2012/0184955 A1 * | 7/2012 | Pivotto | A61B 34/30 606/41 |
| 2012/0277534 A1 * | 11/2012 | Masaki | A61B 1/0052 600/145 |
| 2012/0302829 A1 * | 11/2012 | Omoto | A61B 1/015 600/109 |
| 2013/0172813 A1 * | 7/2013 | Caples | A61B 5/283 604/95.04 |
| 2014/0088577 A1 * | 3/2014 | Anastassiou | A61B 34/76 606/17 |
| 2014/0243615 A1 * | 8/2014 | Schaeffer | A61B 1/267 600/301 |
| 2015/0011830 A1 * | 1/2015 | Hunter | A61B 1/0016 600/118 |
| 2016/0128766 A1 * | 5/2016 | Hyodo | A61B 34/30 606/41 |
| 2018/0317849 A1 * | 11/2018 | Schibli | A61L 29/14 |
| 2019/0094084 A1 * | 3/2019 | Swinehart | G01L 1/02 |
| 2020/0015876 A1 * | 1/2020 | Chou | A61B 34/30 |
| 2020/0015902 A1 * | 1/2020 | Scheib | A61B 1/05 |
| 2020/0405375 A1 * | 12/2020 | Shelton, IV | A61B 18/1815 |
| 2021/0001116 A1 * | 1/2021 | Waldhauser | A61B 34/25 |
| 2021/0330399 A1 | 10/2021 | Netravali et al. | |
| 2022/0087504 A1 * | 3/2022 | Sharma | A61B 17/2909 |
| 2022/0202273 A1 * | 6/2022 | Ninni | A61B 34/30 |
| 2022/0313961 A1 * | 10/2022 | Tang | A61M 5/162 |
| 2023/0000515 A1 * | 1/2023 | Pollack | A61M 25/0152 |
| 2023/0024979 A1 * | 1/2023 | Viering | A61B 1/0605 |
| 2023/0034856 A1 * | 2/2023 | Stefan | A61B 17/29 |
| 2023/0329707 A1 * | 10/2023 | Sharma | A61B 1/00042 |
| 2024/0108849 A1 * | 4/2024 | Singh | A61B 17/22 |
| 2024/0206978 A1 * | 6/2024 | Govari | A61B 34/20 |
| 2024/0252269 A1 * | 8/2024 | Wakana | A61B 34/37 |
| 2024/0285307 A1 * | 8/2024 | Mathis | A61B 17/320725 |
| 2024/0389869 A1 * | 11/2024 | Blank | A61B 5/14546 |

\* cited by examiner

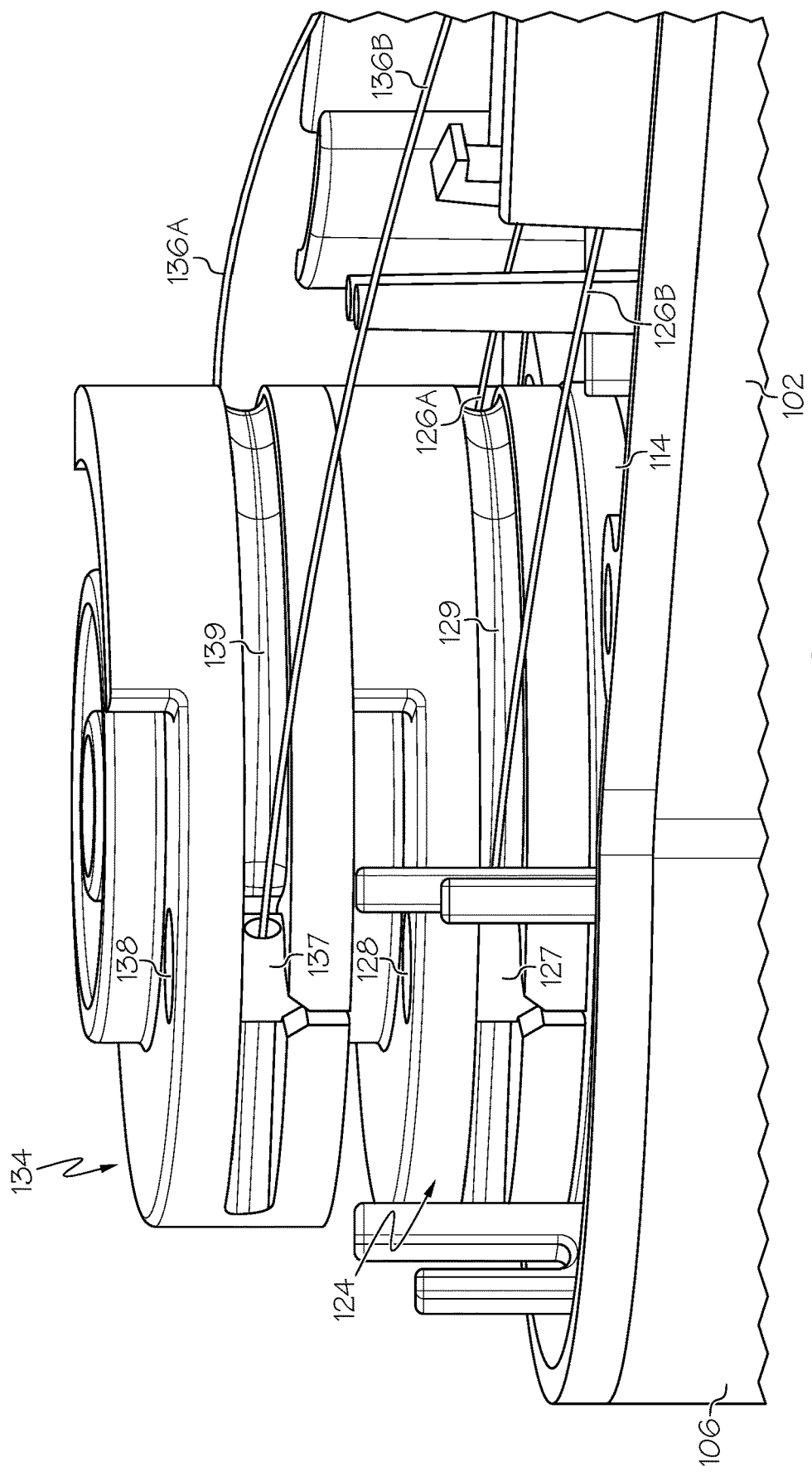

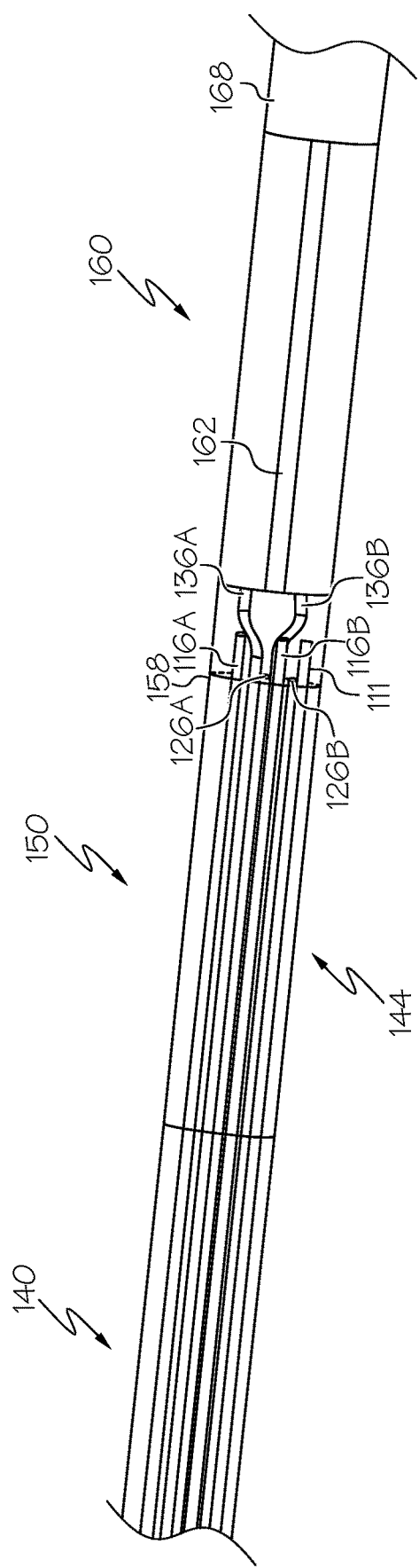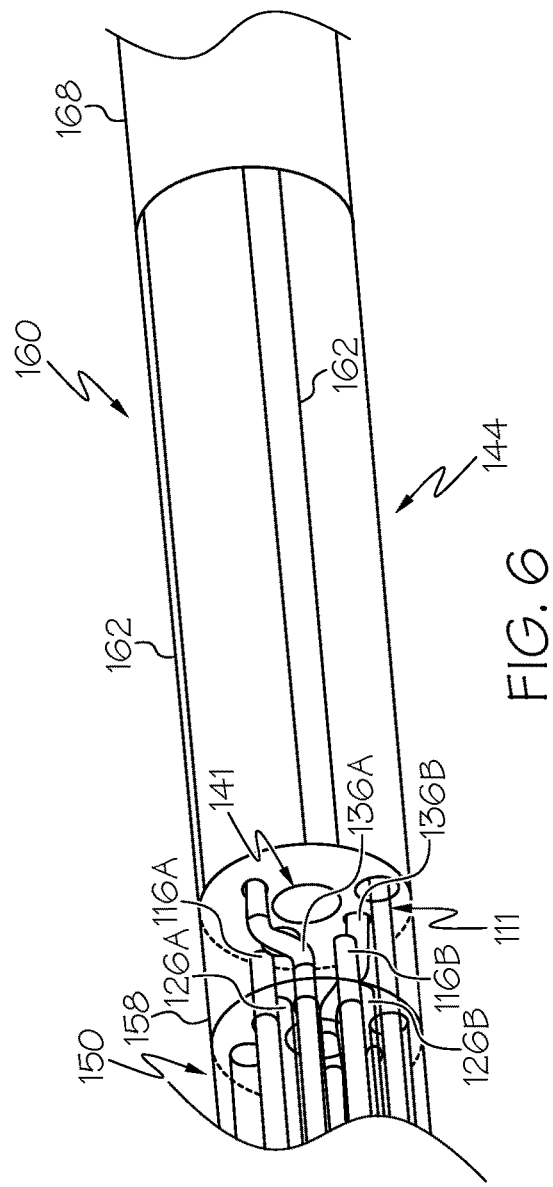

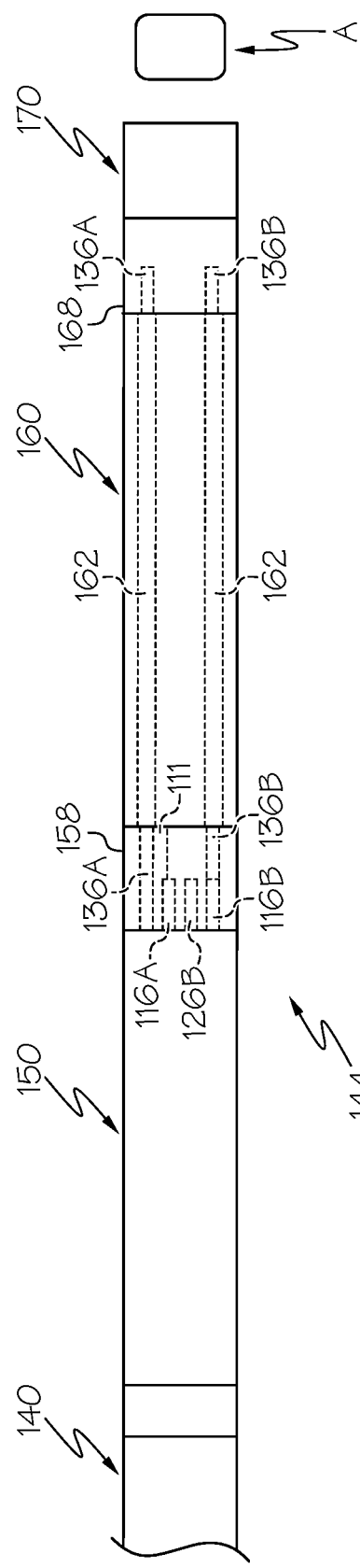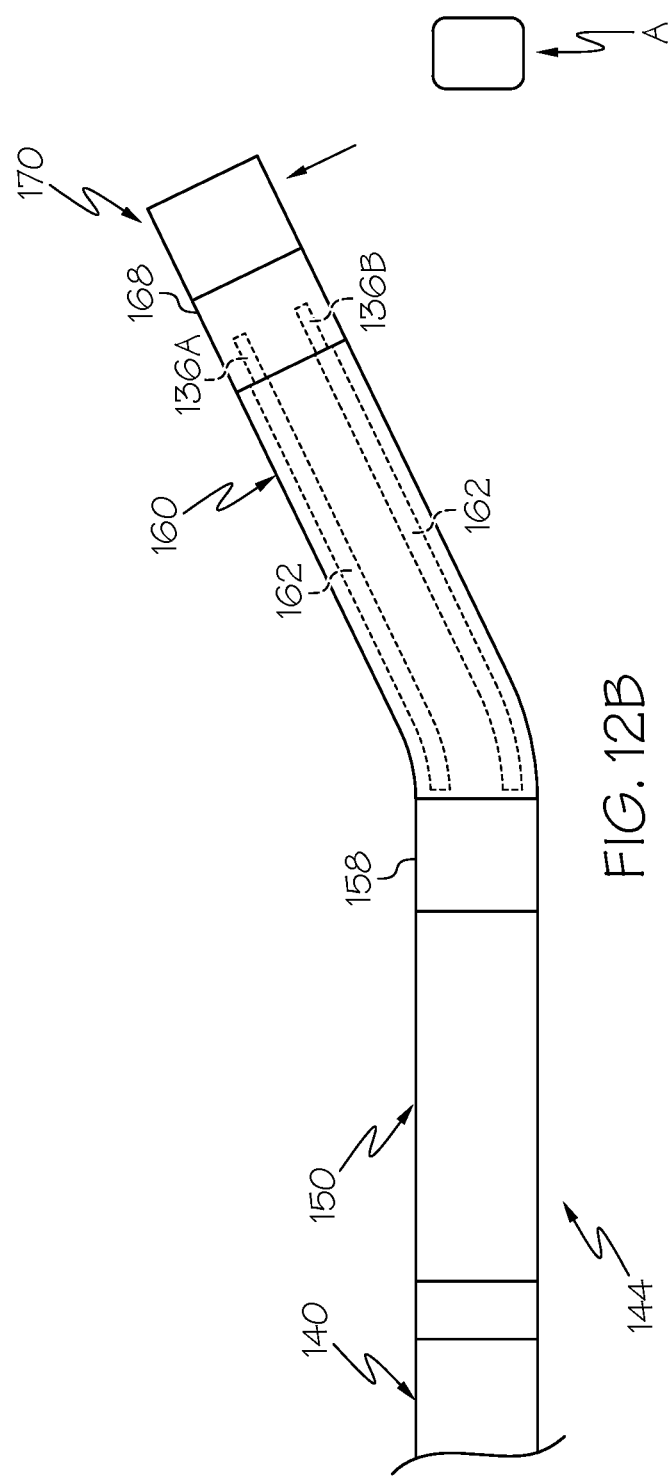

CONTROL ASSEMBLIES FOR MEDICAL DEVICES AND RELATED METHODS OF USE

CROSS-REFERENCE TO RELATED APPLICATIONS

This application claims the benefit of priority of U.S. Provisional Patent Application No. 63/332,578, filed on Apr. 19, 2022, the entirety of which is incorporated herein by reference.

TECHNICAL FIELD

Various aspects of this disclosure relate generally to devices and methods for automating control of a medical device. For example, the disclosure relates to systems, assemblies, and methods for automating control of medical devices at a target treatment site within a subject during a procedure.

BACKGROUND

Technological developments have given users of medical devices the ability to conduct increasingly complex procedures. One challenge in the field of minimally invasive surgeries, such as endoscopy, laparoscopy, bronchoscopy, and thoracoscopy, among other surgical procedures, is associated with facilitating control of medical devices with respect to an orientation and position of such devices during a procedure. In certain procedures, maintaining stability of a medical device positioned within a subject may be difficult due to routine bodily movements of the subject throughout the procedure.

For example, during an endoscopic procedure of a subject's lung, a user may insert the sheath of an endoscope into a bodily lumen of the subject. The user may utilize a handle of the endoscope to control the device during the procedure. Instruments may be passed through a working channel of the endoscope to deliver treatment to a target site within the subject's lung. Given a location of the endoscope within the subject's lung, inadvertent movement of the instrument(s) may be caused by a respiratory motion of the lung. Movement of the endoscope, such as during a biopsy procedure, may lead to potential injury to the subject. To maintain stability of the instrument(s) at the remote site, the user may be required to manually control the endoscope and/or instrument(s) inserted into the working channel throughout the procedure to inhibit inadvertent movement caused by the lung. The current disclosure may solve one or more of these issues or other issues in the art.

SUMMARY

Aspects of the disclosure relate to, among other things, systems, devices, and methods for treating a target treatment site using a medical assembly that provides automated control of a medical device. For example, the medical assembly may include a medical device, a drive mechanism, and a controller. The medical device may include an actuator, a shaft having a distal end coupled to the actuator and positioned at a target treatment site within a subject, and a sensor at the distal end that is configured to measure data indicative of movement of the distal end (e.g., the distal end moving away from the target treatment site).

The actuator may be configured to articulate the distal end based on the data measured by the sensor, thereby moving the distal end toward the target treatment site (e.g., returning the distal end toward the target treatment site). The drive mechanism may include pins configured to engage the actuator, and a motor configured to move the pins upon activation. The controller may be communicatively coupled to the sensor and the motor, and configured to actuate the actuator via movement of the pins to articulate the distal end by a distance that returns the distal end to the target treatment site. Each of the aspects disclosed herein may include one or more of the features described in connection with any of the other disclosed aspects.

According to an example, a medical assembly includes a medical device including a handle having an actuator; a shaft extending distally from the handle, wherein a distal end of the shaft is coupled to the actuator by a wire extending through the shaft; and a sensor at the distal end of the shaft, the sensor is configured to measure data indicative of the distal end of the shaft moving from a first position to a second position; wherein the actuator is configured to articulate the distal end of the shaft based on the data measured by the sensor to move the distal end from the second position to the first position.

Any of the medical assemblies described herein may include any of the following features. The sensor is configured to measure an electrical resistance and the data includes a voltage corresponding to the measured electrical resistance. The medical assembly including a drive mechanism configured to couple with the medical device at the actuator. The drive mechanism includes a housing and one or more pins extending outwardly from the housing. The medical device includes one or more apertures positioned on the actuator, and wherein the actuator is configured to receive the one or more pins through the one or more apertures to couple the medical device to the drive mechanism. The drive mechanism includes a motor coupled to the one or more pins, and the drive mechanism is configured to rotate the actuator by movement of the one or more pins, upon activation of the motor. The medical assembly further including a controller communicatively coupled to the sensor of the medical device and the motor of the drive mechanism. The controller is configured to determine a distance between the first position and the second position based on the data measured by the sensor of the medical device. The controller is configured to actuate the actuator via movement of the one or more pins to articulate the distal end of the shaft by the distance, thereby returning the distal end of the shaft to the first position. The actuator includes a first actuator and the wire includes a first wire, and wherein the handle includes a second actuator and the shaft includes a second wire. The distal end of the shaft is coupled to the second actuator by the second wire. The first actuator is configured to move a proximal portion of the distal end, and the second actuator is configured to move a distal portion of the distal end. The one or more pins includes a first pin configured to engage the first actuator, and a second pin configured to engage the second actuator. The motor includes a first motor coupled to the first pin, and configured to rotate the first pin relative to the handle upon activation, and the drive mechanism includes a second motor coupled to the second pin, and configured to rotate the second pin relative to the handle upon activation. The distal end includes an original configuration in the first position, and a modified configuration when in the second position, wherein the controller is configured to determine the modified configuration of the distal end based on the data measured by the sensor. The controller is configured to rotate at least one of the first pin or the second pin to move the corresponding proximal portion or the distal portion to return the distal end to the original configuration.

According to another example, a medical assembly includes a medical device including a handle having a first actuator and a second actuator; a shaft extending distally from the handle, wherein a proximal portion of the distal end of the shaft is coupled to the first actuator by a first wire, wherein a distal portion of the distal end is coupled to the second actuator by a second wire, wherein the first actuator is configured to move the proximal portion of the distal end, and wherein the second actuator is configured to move the distal portion of the distal end; and a sensor at the distal end that is configured to measure data indicative of the distal end moving from an original configuration to a modified configuration; wherein at least one of the first actuator is configured to articulate the proximal portion of the distal end or the second actuator is configured to articulate the distal portion of the distal end, to move the distal end from the modified configuration to the original configuration, based on the data measured by the sensor.

Any of the medical assemblies described herein may include any of the following features. The medical assembly including a drive mechanism configured to couple with the medical device along the first actuator and the second actuator. The drive mechanism includes a first pin configured to engage the first actuator; a second pin configured to engage the second actuator; a first motor coupled to the first pin, and configured to rotate the first actuator relative to the handle upon activation; and a second motor coupled to the second pin, and configured to rotate the second actuator relative to the handle upon activation. The medical assembly including a controller communicatively coupled to the sensor, the controller is configured to determine the modified configuration of the distal end based on the data measured by the sensor; and rotate at least one of the first pin or the second pin to move the corresponding proximal portion or the distal portion of the distal end to return the distal end to the original configuration.

According to a further example, a method for controlling a medical device includes positioning a shaft of the medical device at a target site; coupling an actuator of the medical device to a drive mechanism by inserting a pin of the drive mechanism into the actuator, wherein the actuator is configured to control movement of the shaft; detecting a displacement of the shaft relative to the target site via a sensor of the medical device; and activating a motor of the drive mechanism to rotate the pin and actuate the actuator, thereby moving the shaft by the displacement and toward the target site.

It may be understood that both the foregoing general description and the following detailed description are exemplary and explanatory only and are not restrictive of the invention, as claimed. As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "distal" refers to a portion farthest away from a user when introducing a device into a patient. The term "proximal" refers to a portion closest to the user when placing the device into the subject. The term "top" refers to a direction or side of a device relative to its orientation during use, and the term "bottom" refers to a direction or side of a device relative to its orientation during use that is opposite of the "top." The term "exemplary" is used in the sense of "example," rather than "ideal." As used herein, the terms "about," "substantially," and "approximately," indicate a range of values within +/−10% of a stated value.

BRIEF DESCRIPTION OF THE DRAWINGS

The accompanying drawings, which are incorporated in and constitute a part of this specification, illustrate aspects of this disclosure and together with the description, serve to explain the principles of the disclosure.

FIG. 3 shows a partial side view of the medical device of FIG. 1.

FIG. 5 shows a partial side view of a distal end of the medical device of FIG. 1.

FIG. 6 shows a partial perspective view of the distal end of the medical device of FIG. 1.

FIG. 12A shows a partial side view of the distal end of the medical device of FIG. 1 in a first position.

FIG. 12B shows a partial side view of the distal end of the medical device of FIG. 1 in a second position.

DETAILED DESCRIPTION

Embodiments of this disclosure relate to automated medical assemblies for facilitating control of a medical device based on sensor data. The medical device may be manually controllable by a user, such as in response to manipulation of one or more actuators on a handle of the medical device, to control movement of a distal end of the medical device relative to a target treatment site. The medical assemblies herein may include a drive mechanism for coupling with the medical device to also provide automated control of the one or more actuators. The drive mechanism may actuate the one or more actuators to provide an automatic movement of the distal end relative to the target treatment site.

Examples of the disclosure may relate to assemblies, devices, and methods for automating control of medical devices to perform various medical procedures and/or treat portions of the lungs, the large intestine (colon), small intestine, cecum, esophagus, any other portion of the gastrointestinal tract, and/or any other suitable patient anatomy (collectively referred to herein as a "target treatment site"). In examples, accessing a patient's esophagus includes endoluminal placement of one or more medical devices into the target treatment site. Placement of the medical devices may be via a catheter, scope (endoscope, bronchoscope, colonoscope, gastroscope, ureteroscope, duodenoscope, laproscope, etc.), tube, or sheath, inserted into an anatomical passageway via a natural orifice or via laparoscopy. The orifice can be, for example, the nose, mouth, or anus, and the placement can be in any portion of the GI tract, including the esophagus, stomach, duodenum, large intestine, or small intestine.

Placement also can be in other organs or other bodily spaces reachable via the GI tract, other body lumens, or openings in the body, including via laparoscopy. This disclosure is not limited to any particular medical device, method, medical procedure, or treatment site within a body. Aspects of the disclosure may be used in connection with any suitable medical instrument and/or medical method, at any suitable site within the body. Various examples described herein include single-use or disposable medical devices. Reference will now be made in detail to aspects of the disclosure, examples of which are illustrated in the accompanying drawings. Wherever possible, the same or similar reference numbers will be used through the drawings to refer to the same or like parts.

Figure 1:
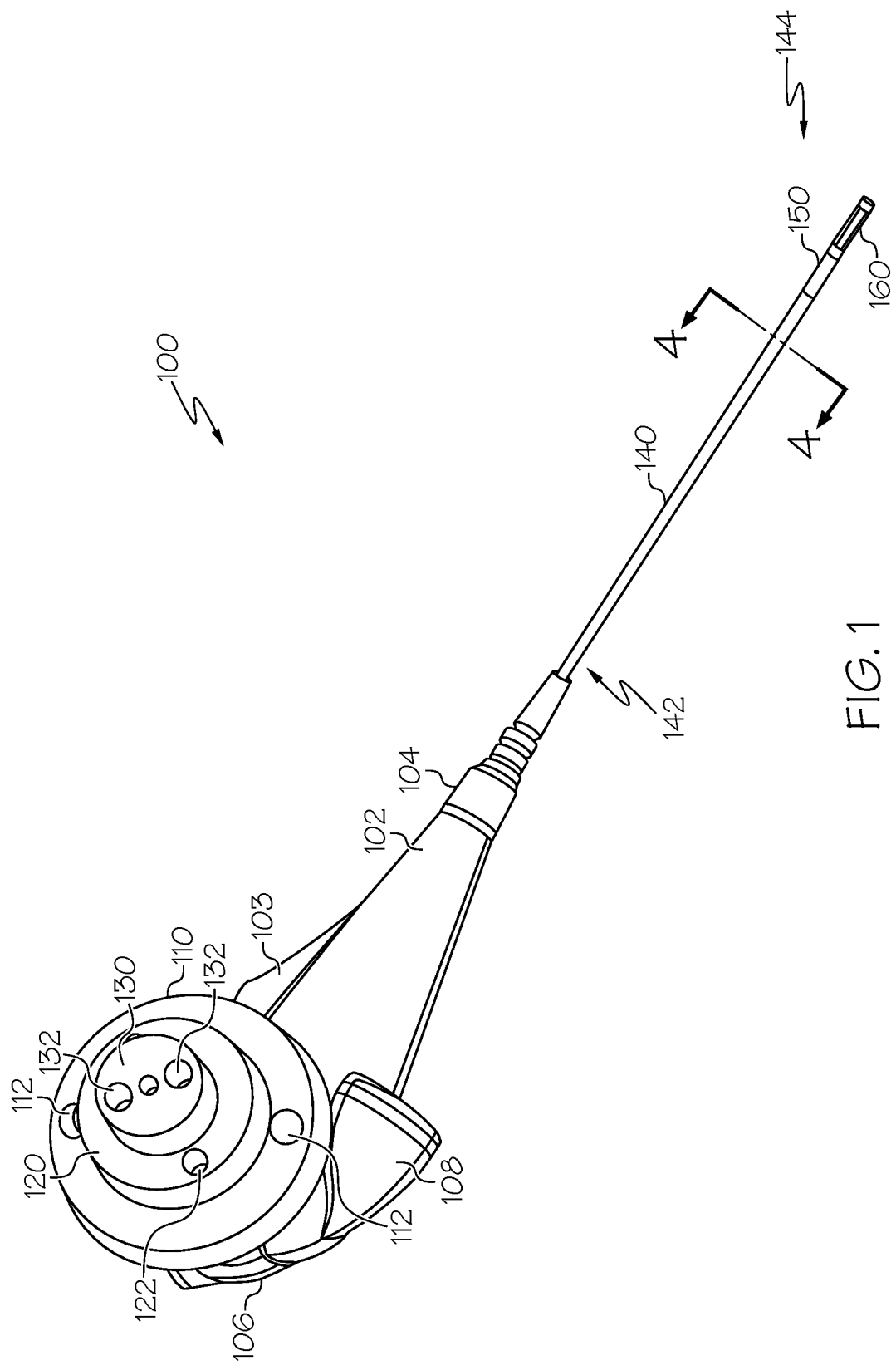
FIG. 1 shows a perspective view of an exemplary medical device.

FIG. 1 shows an exemplary medical device 100 in accordance with one or more examples of this disclosure. Medical device 100 may include a handle 102 having a distal end 104 and a proximal end 106, and a shaft 140 extending distally from distal end 104. Handle 102 may include one or more ports, such as a first port 103 and a second port 108 for receiving one or more medical instruments within medical device 100, and particularly through shaft 140. For example, second port 108 may be configured to receive a medical instrument, such as an umbilical cord or tube, which includes one or more channels for providing suction, irrigation, and/or for receiving a camera wire. As described in detail below, the umbilical cord or tube received in second port 108 may extend into shaft 150 via an interior channel 105 of handle 102 (see FIG. 2).

Medical device 100 may include one or more actuators on the handle 102 positioned adjacent to the proximal end 106, such as a first actuator 110, a second actuator 120, and a third actuator 130. In other embodiments, medical device 100 may include additional and/or fewer actuators than those shown and described herein without departing from a scope of this disclosure.

In the example, third actuator 130, second actuator 120, and first actuator 110 may be positioned over one another in a stacked arrangement, respectively, with second actuator 120 positioned between third actuator 130 and first actuator 110. Stated differently, each of the actuators on handle 102 may be arranged in series with third actuator 130 positioned over and extending radially outward (relative to a longitudinal axis of handle 102) from second actuator 120, second actuator 120 positioned over and extending radially outward from first actuator 110, and first actuator 110 extending radially outward from handle 102. In other embodiments, one or more of first actuator 110, second actuator 120, and/or third actuator 130 may have various other suitable arrangements and/or positions relative to one another and/or handle 102 without departing from a scope of this disclosure.

Each of the actuators on handle 102 may be configured to control one or more control wires disposed within shaft 140. Each of the actuators may be actuated (e.g. rotated) to move the corresponding control wire(s) relative to a lumen of shaft 140. Although the actuators 110, 120, 130 are shown and described as rotatable, other types of actuators (e.g., levers, knobs, buttons, sliders, etc.) may be utilized without departing from a scope of this disclosure. In the embodiment of FIG. 1, the actuators may be actuated via manual manipulation by a user of medical device 100. Additionally or alternatively, the actuators may be actuated via automated control applied by another component of the medical assembly, such as a drive mechanism 200, discussed in detail below (see FIGS. 9-11).

Still referring to FIG. 1, each of the actuators on handle 102 may include one or more apertures that are sized and shaped to receive a corresponding component of drive mechanism 200 (e.g. a pin). In the example, first actuator 110 may include a pair of first apertures 112, second actuator 120 may include a pair of second apertures 122, and third actuator 130 may include a pair of third apertures 132. In some embodiments, a diameter and/or shape of the apertures on each actuator may correspond to a diameter and/or shape of the respective pin of drive mechanism 200 that is to be received by the particular aperture. The diameter and/or shape of the apertures on each of the actuators may be the same and/or different relative to one another. In alternatives, each of first actuator 110, second actuator 120, and third actuator 130 may include only a single aperture, which may have a size and shape that is keyed to a respective pin of drive mechanism 200 that is to be received by the particular aperture.

Shaft 140 may include a longitudinal length defined between a proximal end 142 coupled to handle 102 at distal end 104, and a distal end 144 that is opposite of proximal end 142. Distal end 144 may include a proximal portion 150 and a distal portion 160 that is positioned distally relative to proximal portion 150. As described herein, each of proximal portion 150 and distal portion 160 may be configured to move (e.g., bend, articulate, pivot, etc.) independently relative to one another upon actuation of the one or more actuators. In some embodiments, medical device 100 may include a second shaft that is configured to receive shaft 140 within a lumen of the second shaft (see FIG. 10). As described below, the second shaft may be configured to facilitate a position of shaft 140 relative to a subject for maintaining a fixed position and/or configuration of shaft 140 during a procedure.

Figure 2:
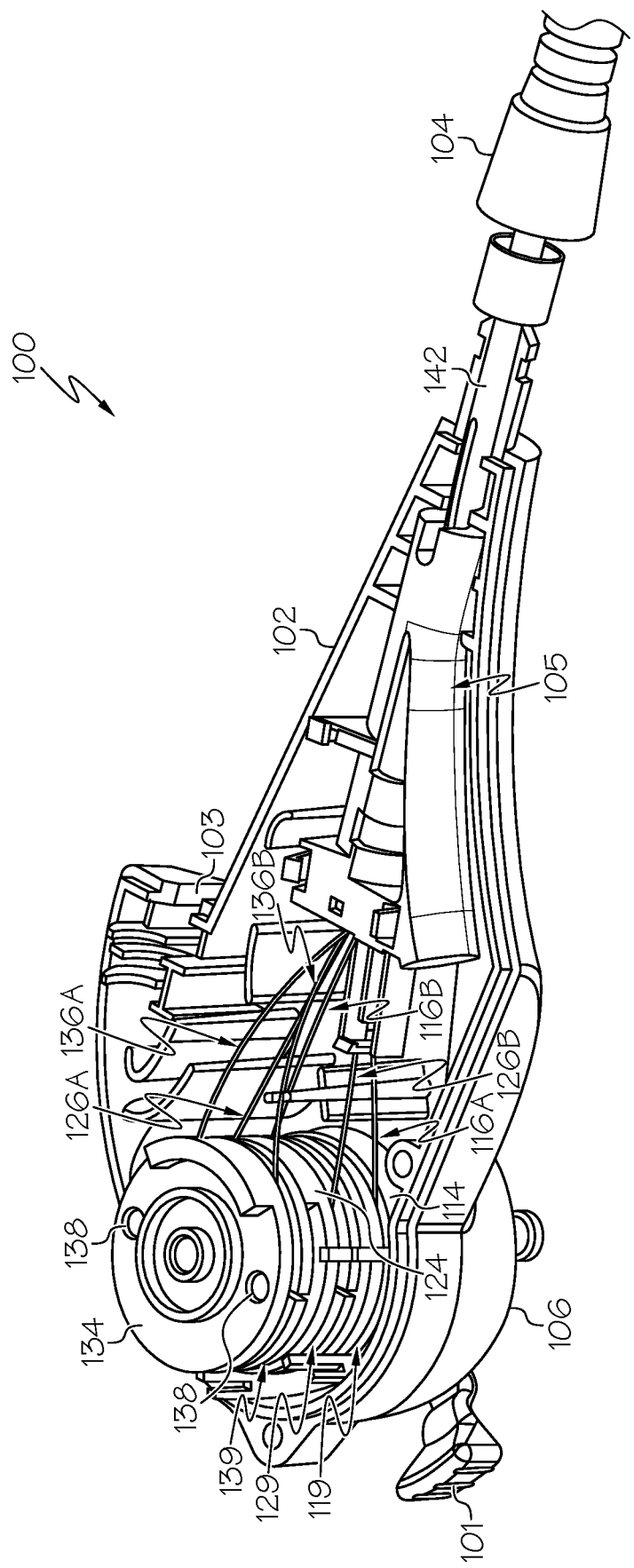
FIG. 2 shows a partial perspective view of the medical device of FIG. 1.

Referring now to FIG. 2, a top housing of handle 102 is omitted to depict one or more internal components of medical device 100. Medical device 100 may include one or more rings rotatably disposed within handle 102 at proximal end 106. For example, medical device 100 may include a first ring 114, a second ring 124, and a third ring 134. Third ring 134, second ring 124, and first ring 114 may be positioned over one another in a stacked arrangement, respectively, with second ring 124 positioned between third ring 134 and first ring 114. Stated differently, each of the rings in handle 102 may be arranged in series with third ring 134 positioned over second ring 124, second ring 124 positioned over first ring 114, and first ring 114 positioned directly on an interior surface of a bottom housing of handle 102.

Each of the rings 114, 124, 134 disposed within handle 102 may be coupled to a corresponding actuator 110, 120, 130 positioned external of handle 102. For example, first actuator 110 may be coupled to first ring 114, second actuator 120 may be coupled to second ring 124, and third actuator 130 may be coupled to third ring 134. Accordingly, each of the respective rings may be configured to move (e.g., rotate) within handle 102 upon actuation of the corresponding actuator on handle 102. It should be appreciated that medical device 100 may include at least one ring disposed within handle 102 for each actuator positioned on an exterior of handle 102. Further, the arrangement and/or position of first ring 114, second ring 124, and/or third ring 134 relative to one another and/or handle 102 may correspond to a respective arrangement and/or position of first actuator 110, second actuator 120, and third actuator 130.

Still referring to FIG. 2, each of the rings may include one or more control wires coupled thereto. For example, each ring may include a groove extending about an exterior surface of the ring, and the one or more control wires may be received within the grooves and securely attached to the ring therein. In the embodiment, first ring 114 may include a first groove 119 and a pair of first control wires 116A, 116B coupled to first ring 114 within first groove 119. Second ring 124 may include a second groove 129 and a pair of second control wires 126A, 126B coupled to second ring 124 within second groove 129. Third ring 134 may include a third groove 139 and a pair of third control wires 136A, 136B coupled to third ring 134 within third groove 139.

Although a pair of control wires are referred to herein, it will be appreciated that the respective pair of control wires may be portions of a single respective wire that is wrapped around a respective ring. As described further below, each of first ring 114, second ring 124, and third ring 134 may include one or more openings for receiving at least one sleeve that is configured to secure the corresponding control wire(s) to the respective ring. For example, third ring 134 may include a pair of openings 138, as shown in FIG. 2, and each of first ring 114 and second ring 124 may include a respective pair of openings.

In some embodiments, as seen in FIG. 3, each of the rings may include at least one sleeve disposed within the groove for securing each terminal (proximal) end of the respective control wires to the ring. For example, third ring 134 may include a pair of third sleeves 137 received through openings 138 and securely fixed within third groove 139 along opposing sides of third ring 134, and each of the pair of third sleeves 137 may be configured to attach (e.g., by crimping) a terminal (proximal) end of at least one of the pair of third control wires 136A, 136B to third ring 134. Second ring 124 may include a pair of second sleeves 127 received through openings 128 and securely fixed within second groove 129 along opposing sides of second ring 124, and each of the pair of second sleeves 127 may be configured to attach (e.g., by crimping) a terminal (proximal) end of at least one of the pair of second control wires 126A, 126B to second ring 124.

Similarly, first ring 114 may include a pair of first sleeves (not shown) received through openings and securely fixed within first groove 119 along opposing sides of first ring 114, and each of the pair of first sleeves may be configured to attach (e.g., by crimping) a terminal (proximal) end of at least one of the pair of first control wires 116A, 116B to first ring 114. With the control wires secured to the respective rings, and each ring movably coupled to a corresponding actuator, each of the rings may be configured to apply a tension to the corresponding control wires upon actuation of the respective actuator coupled thereto.

Referring back to FIG. 2, each of first control wires 116A, 116B, second control wires 126A, 126B, and third control wires 136A, 136B may extend from the respective ring at the proximal end 106 of handle 102, toward the distal end 104, and into shaft 140. As described below, shaft 140 may include a plurality of channels for receiving the control wires, along with various other medical instruments and/or devices (see FIGS. 4A-4B, described in detail below). Handle 102 may include an interior channel 105 extending toward distal end 144 of shaft 140. Interior channel 105 may be sized and shaped to receive one or more medical instruments, such as medical instruments received within medical device 100 via first port 103 and/or second port 108. Further, handle 102 may include a moveable lever 101 at proximal end 106 for selectively locking the one or more actuators 110, 120, 130 on handle 102.

Figure 4A:
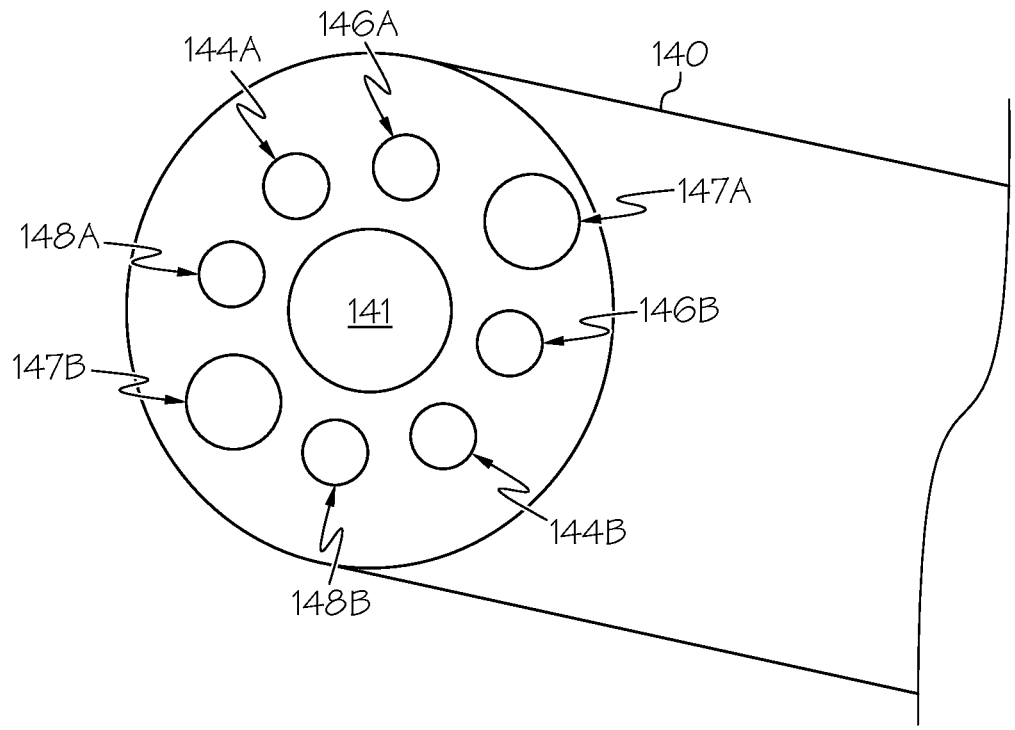
FIG. 4A shows a cross-sectional view of the medical device of FIG. 1, taken along line 4-4 in FIG. 1.
Figure 4B:
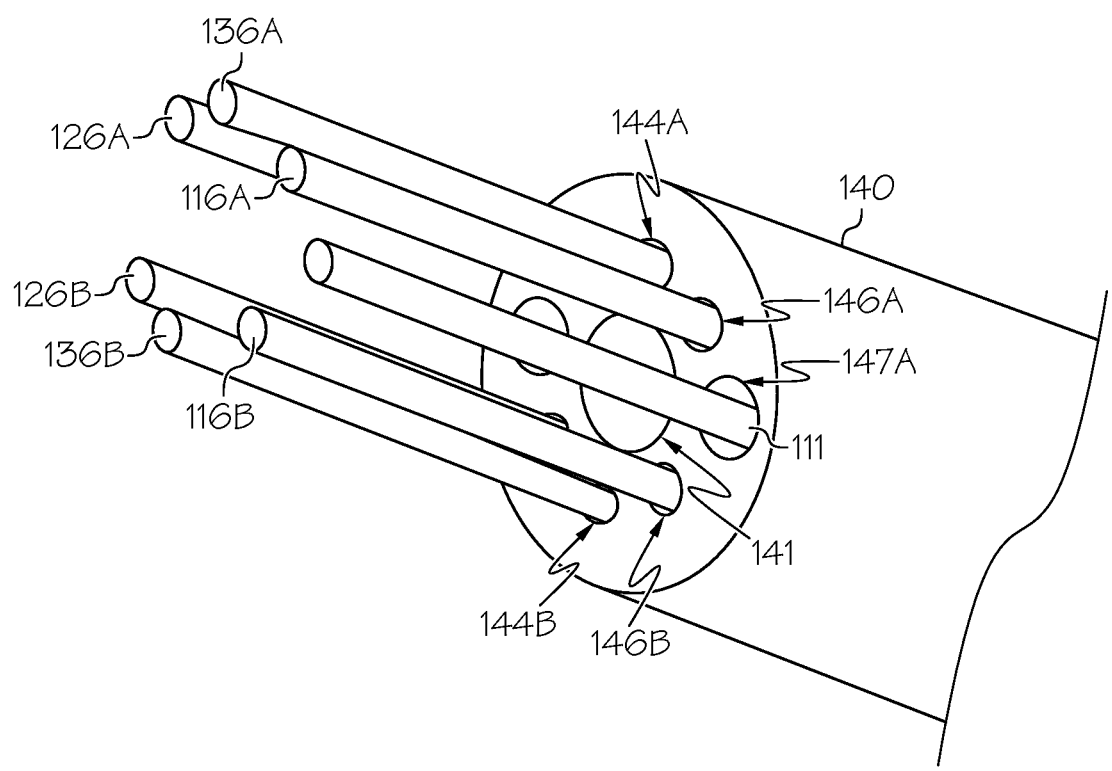
FIG. 4B shows a cross-sectional view of the medical device of FIG. 1 with control wires received therethrough, taken along line 4-4 in FIG. 1.

Referring now to FIGS. 4A-4B, a cross-sectional profile of shaft 140 is depicted with a plurality of channels extending therethrough. It should be appreciated that the plurality of channels may extend through a longitudinal length of shaft 140 from proximal end 142 to distal end 144 (see FIG. 1). In the embodiment, shaft 140 may include a respective pair of channels for receiving each of the pair of control wires from the rings disposed within handle 102. For example, shaft 140 may include a pair of first channels 144A, 144B that are sized and shaped to receive first control wires 116A, 116B, a pair of second channels 146A, 146B that are sized and shaped to receive second control wires 126A, 126B, and a pair of third channels 148A, 148B that are sized and shaped to receive third control wires 136A, 136B.

Each of the control wires may be configured to move relative to the corresponding channel in response to a proximal force and/or tension being applied thereto, such as caused by a rotation of the respective ring coupled to the control wires. The pair of first control wires 116A, 116B and the pair of second control wires 126A, 126B may be configured to articulate proximal portion 150 of distal end 144 relative to and independent of distal portion 160 (see FIG. 1). In the embodiment, first control wires 116A, 116B may be configured to articulate proximal portion 150 at least 180 degrees in a first set of directions, such as, for example, in an upward and a downward direction relative to proximal end 142 of shaft 140.

Second control wires 126A, 126B may be configured to articulate proximal portion 150 at least 180 degrees in a second set of directions that may be different than the first set of directions, such as, for example, in a lateral left and a lateral right direction relative to proximal end 142. The first set of directions and the second set of directions may be approximately perpendicular to one another. Accordingly, simultaneous actuation of at least one first control wire 116A, 116B and at least one second control wire 126A, 126B may provide for an articulation of proximal portion 150 in one or more angled directions. For example, actuating first control wire 116A and second control wire 126A may articulate proximal portion 150 in an upward-left direction, while actuating first control wire 116B and second control wire 126B may articulate proximal portion 150 in a downward-right direction.

The pair of third control wires 136A, 136B may be configured to articulate distal portion 160 of distal end 144 relative to and independent of proximal portion 150. In the embodiment, third control wires 136A, 136B may be configured to articulate distal portion 160 at least 180 degrees in a third set of directions that may be different than the first and second sets of directions, such as, for example, in an upward and downward direction relative to proximal portion 150.

Still referring to FIGS. 4A-4B, shaft 140 may further include at least one working channel 141 for receiving an ancillary instrument (e.g., a guidewire, a biopsy device, etc.), an instrument channel 147A for receiving a lighting device (e.g., a fiber optics cable 111 and/or an imaging device (e.g. a cable/wire for powering the imaging device), and a fluidics channel 147B for providing a fluid (e.g. water), pressurized air, and/or suction to a target treatment site. It should be appreciated that working channel 141, instrument channel 147A, and fluidics channel 147B may receive the one or more instruments and/or devices via interior channel 105 of handle 102 (see FIG. 2).

In other embodiments, shaft 140 may include additional and/or fewer channels than those shown and described herein without departing from a scope of this disclosure. For example, shaft 140 may include a second instrument channel for receiving a cable or wire to provide power to a lighting device, an imaging device, a sensing device, etc. Shaft 140 may be formed of various suitable materials, such as Polytetrafluoroethylene (PTFE). In the example, shaft 140 may be braided and reflowed with 72D extrusion.

FIG. 5 depicts distal end 144 of shaft 140 with at least an exterior surface/wall of shaft 140 and (including an exterior surface/wall of proximal portion 150) omitted for illustrative purposes only. First control wires 116A, 116B, second control wires 126A, 126B, and third control wires 136A, 136B may extend through proximal portion 150 within the respective channels shown and described above in FIGS. 4A-4B. Proximal portion 150 may be secured to distal portion 160 via a first weld ring 158 positioned therebetween. First weld ring 158 may include an interior cavity that may facilitate connection between the channels within proximal portion 150 to corresponding channels within distal portion 160.

For example, each of the first channels 144A, 144B, second channels 146A, 146B, and third channels 148A, 148B may terminate at a distal end of proximal portion 150, such that first control wires 116A, 116B, second control wires 126A, 126B, and third control wires 136A, 136B may exit proximal portion 150 and extend into the interior cavity of first weld ring 158. A terminal (distal) end of first control wires 116A, 116B and second control wires 126A, 126B may terminate at, and be secured to (e.g. welded), an interior surface of first weld ring 158, as shown particularly in FIG. 5B.

Accordingly, movement of first control wires 116A, 116B and/or second control wires 126A, 126B may provide a corresponding movement of first weld ring 158, thereby causing movement of proximal portion 150 relative to distal portion 160. For example, proximal and/or distal movement of first control wires 116A, 116B may at least partially move (e.g. pull, push) first weld ring 158 in at least one of the first set of directions (e.g. upward, downward), thereby causing proximal portion 150 to articulate and/or bend relative to distal portion 160 (and proximal end 142 of shaft 140). Proximal and/or distal movement of second control wires 126A, 126B may at least partially move (e.g. pull, push) first weld ring 158 in at least one of the second set of directions (e.g. left, right), thereby causing proximal portion 150 to articulate and/or bend relative to distal portion 160 (and proximal end 142 of shaft 140). Proximal portion 150 may be formed of various suitable materials, such as a thermoplastic elastomer (e.g. 32D Pebax®). In the example, proximal portion 150 may be braided and reflowed with 32D extrusion.

Referring now to FIG. 6, third control wires 136A, 136B may extend through the interior cavity of first weld ring 158 and may be received within corresponding channels of distal portion 160. In the example, the pair of third channels 148A, 148B from shaft 140 and proximal portion 150 may extend through and/or continue into distal portion 160. In some embodiments, third channels 148A, 148B in proximal portion 150 may be at least partially misaligned with the corresponding third channels 148A, 148B within distal portion 160. Accordingly, third control wires 136A, 136B may curve and/or bend within the interior cavity of first weld ring 158, positioned between proximal portion 150 and distal portion 160, to realign with the third channels 148A, 148B within distal portion 160. In other embodiments, third control wires 136A, 136B may have a linear configuration between proximal portion 150 and distal portion 160 without any curves and/or bends within first weld ring 158.

Figure 7:
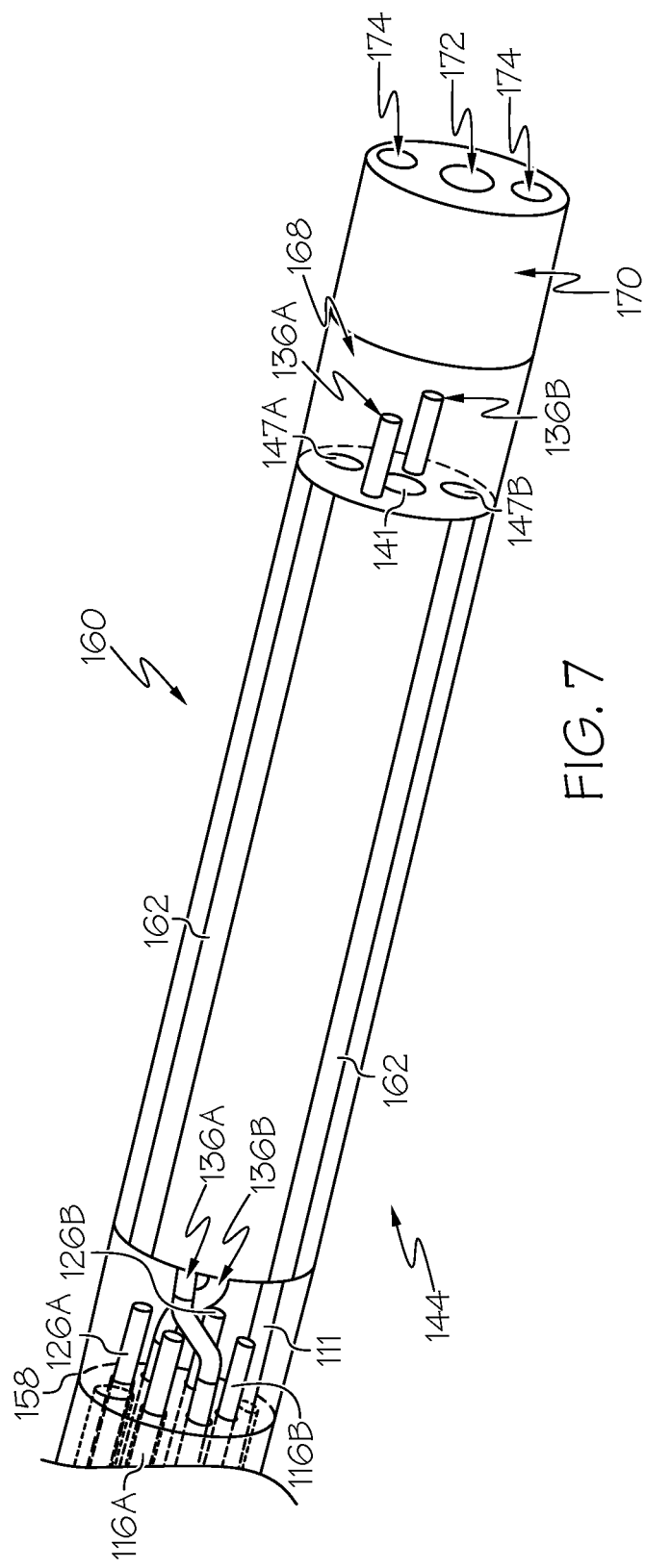
FIG. 7 shows a partial perspective view of a distal end of the medical device of FIG. 1.

As seen in FIG. 7, working channel 141, instrument channel 147A, and fluidics channel 147B may extend from shaft 140 and proximal portion 150, and into distal portion 160. Medical device 100 may include a distal tip 170 at distal end 144 of shaft 140, and distal portion 160 may be secured to distal tip 170 via a second weld ring 168 positioned therebetween. Second weld ring 168 may include an interior cavity that may facilitate connection between the channels of distal portion 160 to corresponding channels extending through distal tip 170. In the example, third channels 148A, 148B may terminate at a distal end of distal portion 160, such that third control wires 136A, 136B may exit distal portion 160 and extend into the interior cavity of second weld ring 168 at the distal end of distal portion 160.

A terminal (distal) end of third control wires 136A, 136B may terminate at, and be secured to (e.g. welded), an interior surface of second weld ring 168. Accordingly, movement of third control wires 136A, 136B may provide a corresponding movement of second weld ring 168, thereby causing movement of distal portion 160 relative to proximal portion 150. For example, proximal and/or distal movement of third control wires 136A, 136B may at least partially move (e.g. pull, push) second weld ring 168 in at least one of the third set of directions (e.g. upward, downward), thereby causing distal portion 160 to move relative to proximal portion 150.

Accordingly, medical device 100 may be operable to move distal end 144 in 180 degrees of motion in all directions via movement of proximal portion 150 and distal portion 160, as caused by the selective actuation of first actuator 110, second actuator 120, and third actuator 130. Working channel 141, instrument channel 147A, and fluidics channel 147B may extend from distal portion 160 and through distal tip 170.

Still referring to FIG. 7, distal tip 170 may include one or more openings for each of the channels extending therethrough. For example, distal tip 170 may include at least one primary opening 172 and a pair of secondary openings 174. Primary opening 172 may be aligned with working channel 141, and at least one of the pair of secondary openings 174 may be aligned with each of instrument channel 147A and fluidics channel 147B. Accordingly, the one or more medical instruments and/or devices received through each of the channels in shaft 140 (e.g. from first port 103 and/or second port 108), proximal portion 150, and distal portion 160 may extend out of medical device 100 via the corresponding opening at distal tip 170.

In one example, distal tip 170 may receive an imaging device, such as via the instrument channel 147A. The imaging device may include a camera, an image sensor, a fiber optic imaging device, a peripheral vision probe, and/or other devices. The imaging device may be operable to record images and/or livestream video of a target treatment site within a subject. Medical device 100 may further include one or more sensors 162 disposed on an exterior surface of distal portion 160 or on an interior of distal portion 160. In the example, medical device 100 may include a plurality of sensors 162 positioned in an annular array about an exterior surface distal portion 160. Sensors 162 may extend along a longitudinal length of distal portion 160 between first weld ring 158 and second weld ring 168. Sensors 162 may include flex sensors (e.g., a variable resistor) that may be configured to move and/or bend pursuant to a corresponding movement of distal portion 160. In other words, sensors 162 may be flexibly deformable in accordance with a shape and/or configuration of distal portion 160.

Figure 8:
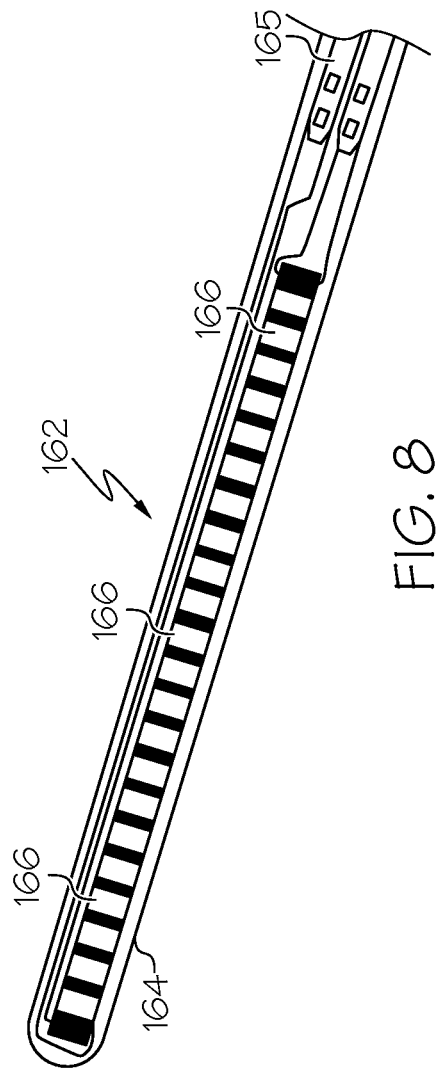
FIG. 8 shows a perspective view of a sensor of the medical device of FIG. 1.

Referring to FIG. 8, each sensor 162 may include a body (base) 164 with a connector 165 at a proximal end of sensor 162, and a plurality of metal plates 166 disposed along a longitudinal length of body 164. Sensors 162 may be configured to measure an electrical resistance and/or voltage that is indicative of an amount of deflection of distal portion 160 (relative to proximal portion 150) by detecting a resistance via the plurality of metal plates 166.

For example, a resistance of sensors 162 may increase as body 164 bends (measured in the form of a voltage change by metal plates 166) in response to a corresponding movement and/or deflection of distal portion 160 relative to proximal portion 150. In some examples, the resistance may be proportionate to the degree (extent) of deflection. Sensors 162 may be further configured to detect a location of distal end 144 relative to a target treatment site within a subject. Connector 165 may be operable to transmit the sensor data measured by sensors 162 to a controller of the medical assembly, such as, for example, by a wired connection. In other embodiments, sensors 162 may be operable to transmit the sensor data wirelessly to the controller. In further embodiments, connector 165 may be omitted entirely.

Figure 9:
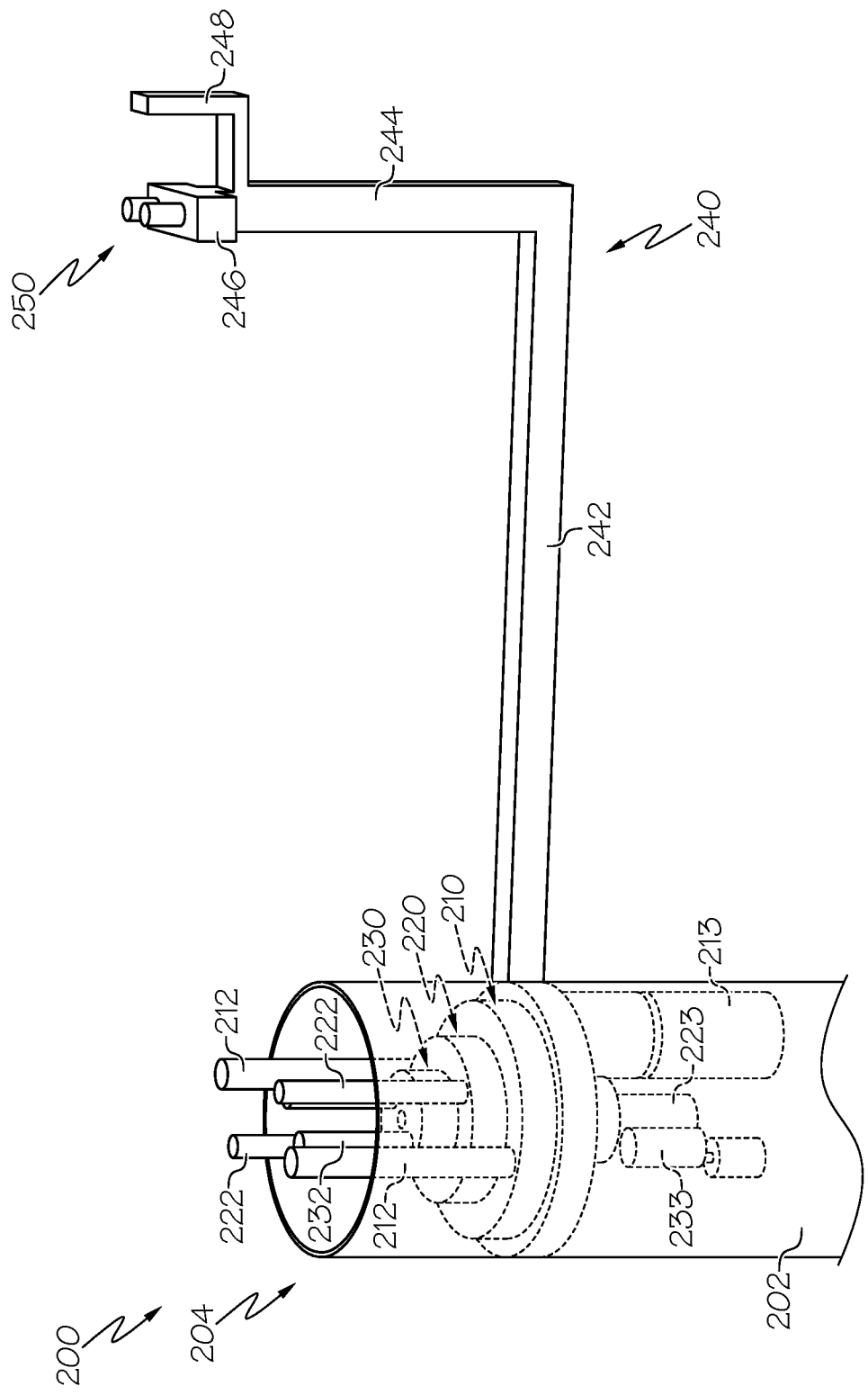
FIG. 9 shows a partial perspective view of an exemplary drive mechanism.

Referring now to FIG. 9, an exemplary drive mechanism 200 of the medical assembly is depicted. Drive mechanism 200 may include a tower platform 202 having a proximal (upper) end 204 and a distal (lower) end 206 (see FIG. 11). Proximal end 204 may define an interface surface for receiving medical device 100 on tower platform 202, such that a user of the medical assembly may suspend medical device 100 on drive mechanism 200 without requiring continuous handling of medical device 100 during a procedure. Drive mechanism 200 may include one or more pins extending outwardly from proximal end 204 for interfacing with the one or more actuators on medical device 100. For example, drive mechanism 200 may include a pair of first pins 212, a pair of second pins 222, and a pair of third pins 232 (only one of pins 232 is labeled due to a perspective angle of FIG. 9). Each of the pair of pins may be configured to extend into and/or engage corresponding apertures of the one or more actuators on handle 102 when medical device 100 is coupled to drive mechanism 200, as discussed below.

Each of the pair of pins may be coupled to a corresponding ring disposed within tower platform 202. For example, first pins 212 may be secured to a first ring 210, second pins 222 may be secured to a second ring 220, and third pins 232 may be secured to a third ring 230. Third ring 230, second ring 220, and first ring 210 may be positioned over one another in a stacked arrangement, respectively, with second ring 220 positioned between third ring 230 and first ring 210. Stated differently, each of the rings in tower platform 202 may be arranged in series with third ring 230 positioned over second ring 220, and second ring 220 positioned over first ring 210. It should be appreciated that drive mechanism 200 may include at least one ring disposed within tower platform 202 for each actuator positioned on an exterior of handle 102. Further, the arrangement and/or position of first ring 210, second ring 220, and/or third ring 230 relative to one another and/or tower platform 202 may correspond to a respective arrangement and/or position of first actuator 110, second actuator 120, and third actuator 130 on handle 102.

Still referring to FIG. 9, drive mechanism 200 may further include at least one motor coupled to each of the rings, such that each motor may be configured to move (e.g. rotate) the corresponding ring independently of the other rings upon activation. In the example, drive mechanism 200 may include a first motor 213 coupled to first ring 210, a second motor 223 coupled to second ring 220, and a third motor 233 coupled to third ring 230. It should be appreciated that drive mechanism 200 may include at least one ring (and corresponding pins) for each actuator on medical device 100.

Drive mechanism 200 may include a support member 240 configured to hold at least a portion of shaft 140 when medical device 100 is coupled to drive mechanism 200. Support member 240 may include a first arm 242 extending laterally outward from tower platform 202, adjacent to proximal end 204, and a second arm 244 extending proximally (upward) from a terminal (distal) end of first arm 242. Support member 240 may further include a hand 246 and a finger 248 at a terminal end of second arm 244. Each of hand 246 and finger 248 may define a platform and/or surface for receiving a portion of medical device 100. In the example, hand 246 may include a horizontal interface that is transverse (e.g. perpendicular) to a vertical interface of finger 248, and each of the interfaces defined by hand 246 and finger 248 may be configured to support a component of medical device 100 (e.g. shaft 140) when medical device 100 is coupled to drive mechanism 200, as discussed in detail below.

As discussed in further detail below, drive mechanism 200 may further include one or more rotatable members 250 (e.g. rollers) on support member 240, and particularly disposed along the horizontal interface of hand 246. Rotatable members 250 may be configured to rotate about a central axis extending along a longitudinal length of rotatable members 250. Rotatable members 250 may be configured to translate shaft 140 (e.g., move shaft 140 axially, in a proximal or distal direction) relative to a target treatment site within a subject (and/or relative to handle 102) upon rotation of rotatable members 250. As described herein, rotatable members 250 may at least partially facilitate automated movement of shaft 140 toward the target treatment site during a procedure.

In exemplary use of a medical assembly including medical device 100 and drive mechanism 200, a user (e.g. physician) may control medical device 100 manually or remotely (e.g. via a user device 10) to navigate shaft 140 through a body of the subject. For example, the user may actuate medical device 100 by actuating (e.g. rotating) one or more of first actuator 110, second actuator 120, and/or third actuator 130 by hand to move (e.g. articulate, deflect, and/or bend) proximal portion 150 and distal portion 160 independently relative to one another to position distal end 144 at a target treatment site. Alternatively, the user may couple medical device 100 to drive mechanism 200 to control actuation of the one or more actuators 110, 120, 130 by transmitting input signals from a user device 10 to move distal end 144, as described in further detail below.

By way of illustrative example only, the target treatment site may be located within a lower lung zone of the subject, such as below the hili. As the user navigates shaft 140 through the subject's body, a location of distal end 144 may be determined via sensor data transmitted by the plurality of sensors 162. Further, the user may determine a position of the target treatment site via image data transmitted by an imaging device extending out of distal tip 170. It should be appreciated that medical device 100 may be communicatively coupled to a display screen for receiving the sensor data and/or image data from sensors 162 and the imaging device, respectively.

Figure 10:
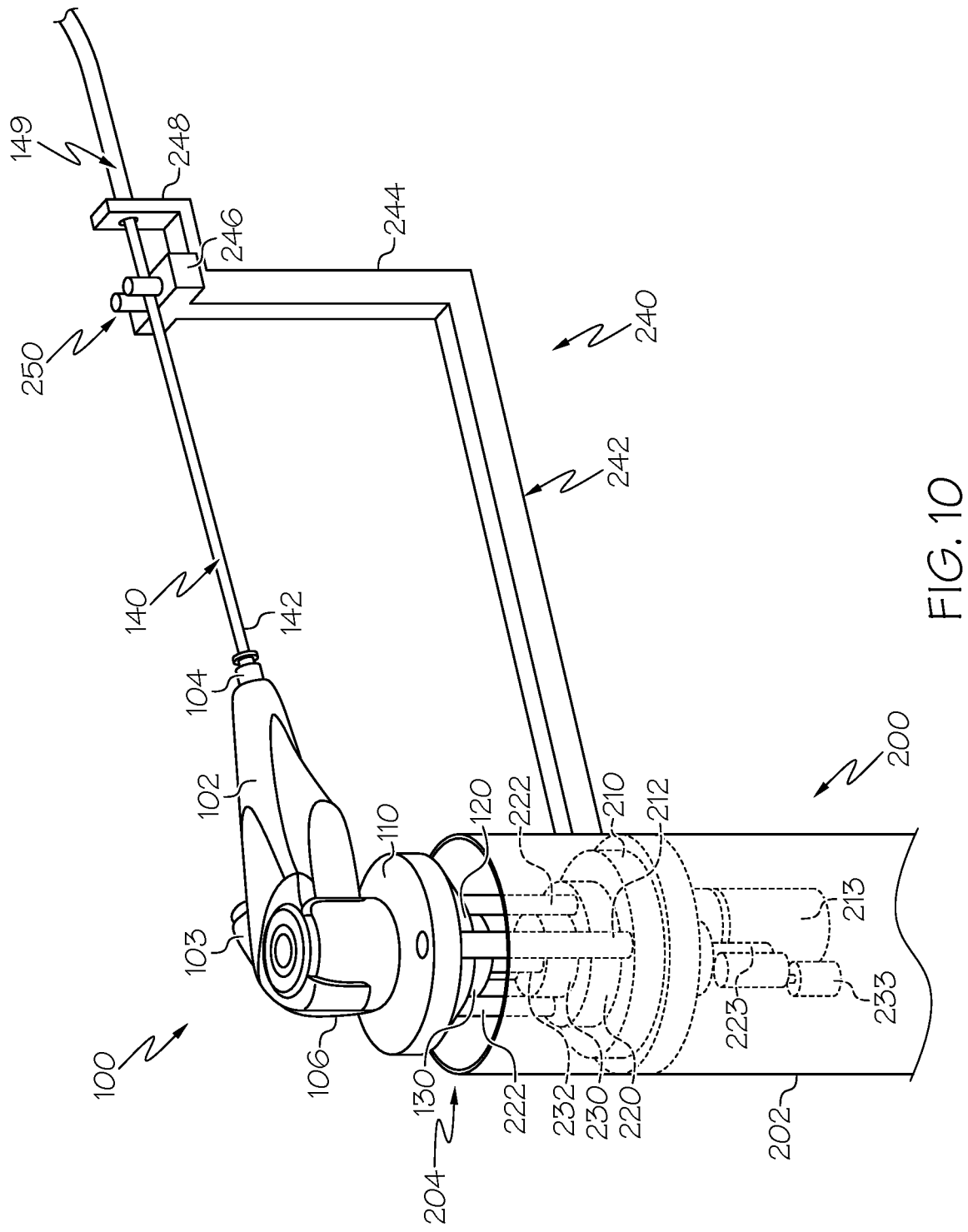
FIG. 10 shows a partial perspective view of the medical device of FIG. 1 coupled to the drive mechanism of FIG. 9.

As seen in FIG. 10, medical device 100 may be coupled to drive mechanism 200 by attaching proximal end 106 of handle 102 to proximal end 204 of tower platform 202. In the embodiment, first pins 212 may be inserted into first apertures 112 of first actuator 110, second pins 222 may be inserted into second apertures 122 of second actuator 120, and third pins 232 may be inserted into third apertures 132 of third actuator 130 (see FIG. 1) to couple handle 102 to proximal end 204. Accordingly, first ring 210 may be movably coupled to first actuator 110 via the receipt of first pins 212 by first apertures 112, second ring 220 may be movably coupled to second actuator 120 via the receipt of second pins 222 by second apertures 122, and third ring 230 may be movably coupled to third actuator 130 via the receipt of third pins 232 by third apertures 132.

In some embodiments, drive mechanism 200 may include one or more medical instruments that may be coupled to medical device 100 when handle 102 is attached to tower platform 202. For example, drive mechanism 200 may include an umbilicus cord or tube having one or more channels for providing suction, irrigation, and/or a channel for receiving a camera wire. The umbilicus cord or tube may be coupled to medical device 100 via one or more of first port 103 and/or second port 108.

With handle 102 coupled to tower platform 202, shaft 140 may be received by support member 240. In the example, an intermediate portion of shaft 140 may be positioned on hand 246. The intermediate portion of shaft 140 may be disposed between the pair of rotatable members 250, and received through a central opening of finger 248. Rotatable members 250 may be configured to contact and/or interface with an exterior surface of shaft 140, such that movement of rotatable members 250 (e.g. rotation) may cause a corresponding movement of shaft 140 (e.g. translation).

For example, rotatable members 250 may be configured to rotate in a first (distal) direction relative to hand 246 to translate shaft 140 in the first (distal) direction relative to handle 102. Rotatable members 250 may be further configured to rotate in a second (proximal) direction relative to hand 246 to translate shaft 140 in the second (proximal) direction relative to handle 102. As rollers 250 rotate, they may exert a frictional force on shaft 140. Accordingly, shaft 140 may be configured to translate relative to handle 102, support member 240, and/or a target treatment site within the subject in response to a rotation of rotatable members 250. In some embodiments, shaft 140 may be configured to flex and/or bend to facilitate translation of shaft 140 upon rotation of rotatable members 250. In other embodiments, shaft 140 may be longitudinally expandable and/or collapsible to facilitate translation of shaft 140 relative to handle 102.

In some embodiments, medical device 100 may include a second shaft 149 that may be configured to movably receive shaft 140 through a lumen of second shaft 149. A proximal end of second shaft 149 may be secured to finger 248 such that second shaft 149 may be fixed and/or immovable relative to support member 240. Second shaft 149 may be flexible to facilitate navigating shaft 140 within an environment (e.g. procedure room) and toward a body of the subject. Further, second shaft 149 may be sufficiently rigid to maintain a modified shape and/or configuration in response to manual manipulation (e.g. physical deformation) of second shaft 149 by a user. As such, second shaft 149 may be configured to maintain a fixed orientation upon manual adjustment by the user, such that second shaft 149 may maintain shaft 140 at the fixed orientation during the procedure without requiring continuous manual control by the user. Shaft 140 may be able to move axially relative to shaft 140, to allow shaft 140 to translate proximally or distally.

Figure 11:
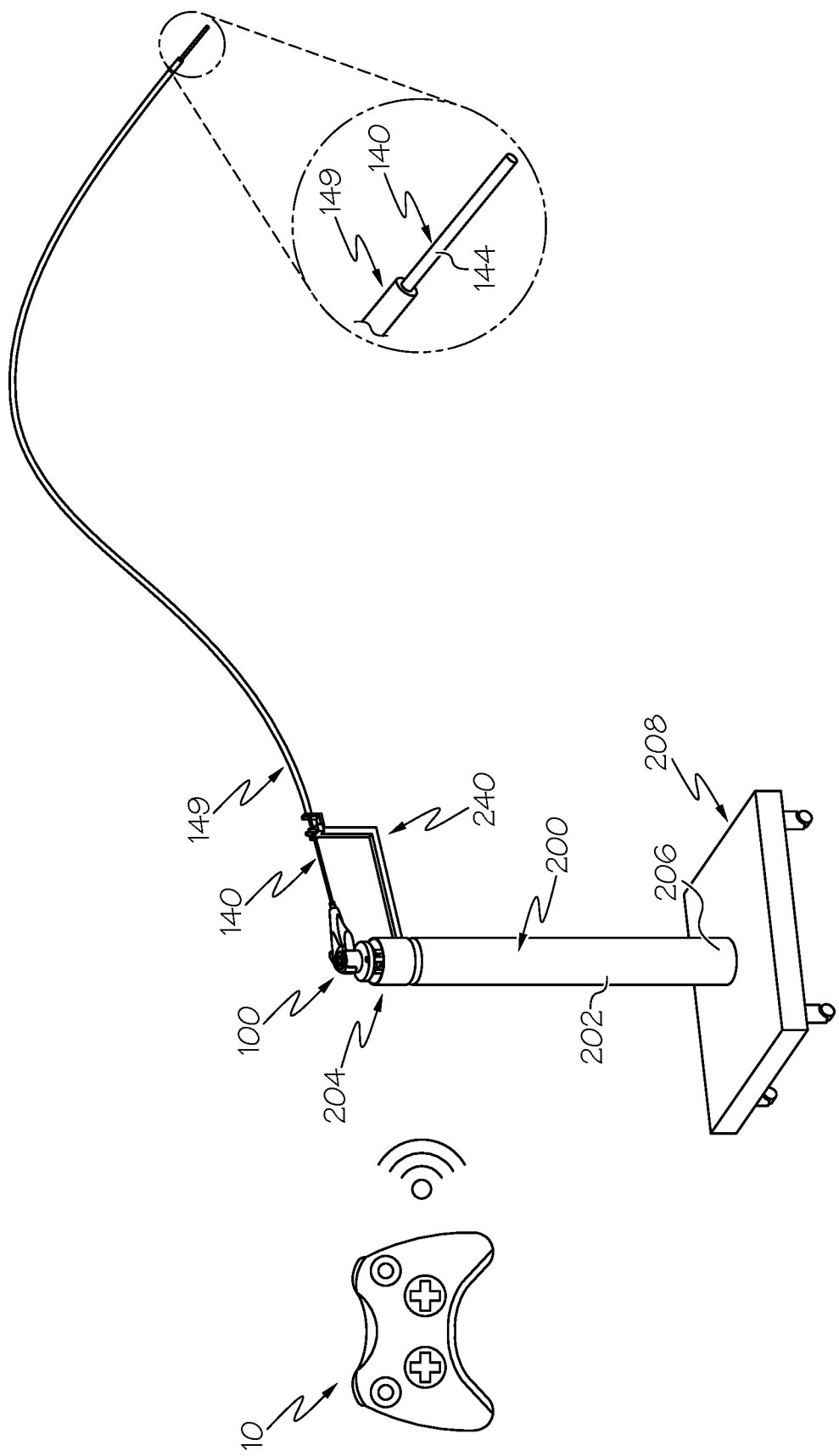
FIG. 11 shows a perspective view of a user device communicatively coupled to the drive mechanism of FIG. 10 for controlling the medical device of FIG. 1.

As seen in FIG. 11, distal end 206 of tower platform 202 may include a movable base 208 (e.g. one or more wheels) for providing selective movement of medical device 100 and drive mechanism 200 within the environment to facilitate positioning the medical assembly relative to the subject. It should further be appreciated that drive mechanism 200 may be sized to occupy minimal space within an environment (e.g. procedure room). Distal end 144 of shaft 140 may extend outward from a distal end opening of second shaft 149, such as, for example, at a point within the environment external to the body of the subject prior to shaft 140 being received within the body.

With medical device 100 coupled to drive mechanism 200, the user of the medical assembly may control medical device 100 via a user input(s) generated at a user device 10 that is communicatively coupled (e.g. wireless or wired connection) to an exemplary controller of the medical assembly. In some embodiments, the controller may be separate from medical device 100 and drive mechanism 200, such as a remote device. In other embodiments, the controller may be included in one or more of medical device 100 and/or drive mechanism 200. In further embodiments, medical device 100 and drive mechanism 200 may each include a controller that are communicatively coupled to one another, and configured to cooperatively execute the one or more processes described in detail herein.

Still referring to FIG. 11, the user may transmit a user input(s), from user device 10, indicative of controlling medical device 100. For example, the user input(s) may transmit a command signal to drive mechanism 200 for translating shaft 140, articulating proximal portion 150, and/or articulating distal portion 160, relative to the subject. The user input(s) generated at user device 10 may facilitate positioning distal end 144 of shaft 140 at the target treatment site within the subject and/or delivering treatment at the target treatment site.

Referring now to FIG. 12A, with distal end 144 positioned adjacent to a target treatment site A within the subject (e.g., within a lower lung zone), the user may visualize a location of the target treatment site A via an imaging device and the one or more medical instruments and/or devices received through shaft 140 may exit distal tip 170 to access the target treatment site A via primary opening 172 and secondary openings 174 (see FIG. 7).

During the procedure at the target treatment site A, the user of the medical assembly may automate continued control of medical device 100 via autonomous movement of shaft 140 to maintain distal end 144 at the target treatment site A. For example, the controller may automatically operate drive mechanism 200 to control medical device 100. In alternatives, the controller may supplement the user's control of medical device 100 with user device 10 with automated control, such that a combination of automatic and user-initiated control is provided. It should be appreciated that a position of shaft 140 within the subject, and particularly a first position of distal end 144 relative to the target treatment site A, may be affected by a respiratory motion of the subject's lungs during the procedure. To stabilize a position of distal end 144 relative to the target treatment site A during use of the medical assembly, the medical assembly may be operable to automatically move (e.g. translate, articulate, bend, pivot, etc.) shaft 140 to maintain distal end 144 at the first position adjacent to the target treatment site A throughout the procedure.

As seen in FIG. 12B, distal end 144 may be inadvertently moved to a second position that is relatively further from the target treatment site A than the first position seen in FIG. 12A. Inadvertent movement of distal end 144 may be caused various factors, such as respiration of the subject's body. Sensors 162 may be configured to detect, record, and transmit sensor data in response to the inadvertent movement of distal end 144 from the first position to the second position. In the example, sensors 162 may be configured to measure an electrical resistance and the sensor data may include a voltage corresponding to the electrical resistance.

The controller of the medical assembly may receive the sensor data recorded by sensors 162 to determine an offset distance (e.g. displacement) or angle between the first position (FIG. 12A) and the second position (FIG. 12B) of distal end 144 relative to the target treatment site A. In other embodiments, the controller may be configured to determine a modified configuration of distal end 144 (FIG. 12B) (e.g., angle of proximal portion 150 and distal portion 160) relative to an original configuration of distal end 144 (FIG. 12A) based at least partially on the sensor data measured by sensors 162.

The controller may be operable to automate motorized control of medical device 100 to compensate for any spatial deviation of distal end 144 of shaft 140 relative to the target treatment site A. For example, the controller may be configured to determine a spatial extent and/or direction of deflection of distal portion 160 relative to the target treatment site A based at least partially on a change in voltage measured by sensors 162. For example, the controller may be configured to determine that the offset distance or angle that distal portion 160 and/or proximal portion 150 has moved relative to the target treatment site A is proportionate to the difference in value of the voltage measurement detected by sensors 162 prior to and after the inadvertent movement of distal end 144.

The controller of the medical assembly may be further configured to determine that a direction of movement of distal portion 160 relative to the target treatment site A is based at least partially on a relative location of the sensors 162 disposed about the exterior surface of distal portion 160 that detect a voltage measurement change. For example, one or more of the plurality of sensors 162 positioned along and/or adjacent to a first surface of distal portion 160 (e.g. top, bottom, left-side, right-side, etc.) may detect a greater difference in voltage measurement than one or more other sensors 162 positioned along and/or adjacent to an opposite surface of distal portion 160. Accordingly, the controller may be operable to determine that a direction (e.g. upward, downward, left, right, etc.) of movement of distal portion 160 is based at least partially on a location of the sensors 162 that measure a greater difference in voltage.

The controller may be configured to automatically activate one or more of the motors of drive mechanism 200 to move the corresponding ring(s) movably coupled thereto. Given the connection between the respective pins on each ring and the apertures of each actuator, the controller may be configured to actuate the one or more actuator(s) connected to the ring(s) to cause movement of proximal portion 150 and/or distal portion 160.

For example, the controller may be configured to determine that an articulation of proximal portion 150 toward at least one of the first set of directions, as provided by an actuation of first control wires 116A, 116B, may return distal end 144 from the second position to the first position that is adjacent to the target treatment site A. Accordingly, the controller of the medical assembly may be operable to activate first motor 213 to rotate first ring 210 and the pair of first pins 212 coupled thereto. In response to rotating first pins 212, which are received within first apertures 112, the controller may actuate first actuator 110 to translate first control wires 116A, 116B, thereby articulating proximal portion 150 in at least one of the first set directions.

In another example, the controller may be configured to determine that an articulation of proximal portion 150 toward at least one of the second set of directions, provided by an actuation of second control wires 126A, 126B, may move distal end 144 from the second position to the first position that is adjacent to the target treatment site A. The controller may be operable to activate second motor 223 to rotate second ring 220 and second pins 222. With second pins 222 received within second apertures 122, second actuator 120 may be actuated to translate second control wires 126A, 126B, thereby articulating proximal portion 150 in at least one of the second set directions.

By way of further example, the controller may be configured to determine that an articulation of distal portion 160 toward at least one of the third set of directions, as provided by an actuation of third control wires 136A, 136B, may move distal end 144 from the second position to the first position that is adjacent to the target treatment site A. The controller may activate third motor 233 to rotate third ring 230 and the third pins 232 coupled thereto. By rotating third pins 232, third actuator 130 may be actuated to translate third control wires 136A, 136B, and thereby articulate distal portion 160 to at least one of the third set of directions, due to third pins 232 being received within third apertures 132.

The controller may further be configured to determine that articulation of proximal portion 150 and/or distal portion 160 in multiple directions is required. The controller may actuate multiple of first control wires 116A, 116B, second control wires 126A, 126B, and/or third control wires 136A, 136B in order to articulate proximal portion 150 and/or distal portion 160 in multiple directions. Any combination of control wires may be articulated in order to obtain an articulation that the controller determines is required.

Figure 12C:
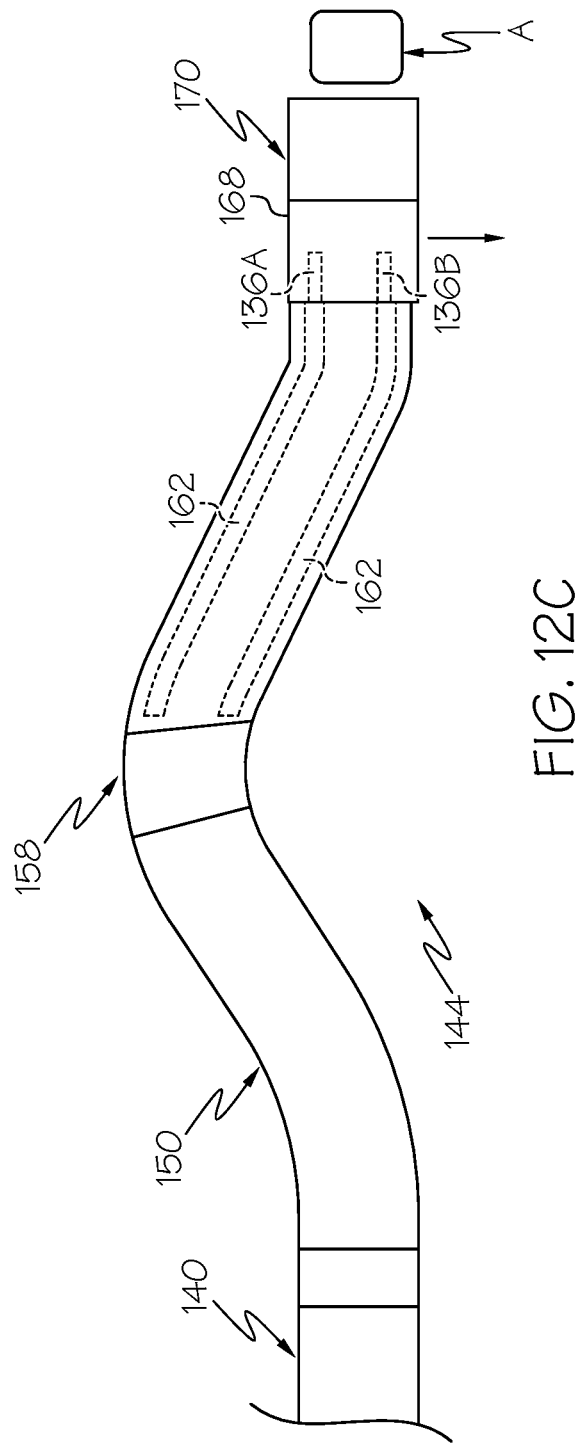
FIG. 12C shows a partial side view of the distal end of the medical device of FIG. 1 articulated to the first position.

As seen in FIG. 12C, the controller of the medical assembly may determine that articulation of one or more of proximal portion 150 and/or distal portion 160 may be necessary in one or more directions to return distal end 144 to the target treatment site A. The controller may be operable to automatically adjust a current position (i.e. the second position) and/or a current configuration (i.e. the modified configuration) of distal end 144 relative to the target treatment site A throughout the procedure to continuously maintain distal end 144 at the first position and/or the original configuration near the target treatment site A.

In this instance, the medical assembly may improve a stability of the one or more medical instruments and/or devices received through shaft 140 (e.g. via working channel 141, instrument channel 147A, and/or fluidics channel 147B). By stabilizing the medical instruments and/or devices positioned at the target treatment site A, despite the inadvertent movements of shaft 140 as caused by the subject's respiratory motion, inadvertent injury to the subject may be minimized and the effective treatment of the subject may be improved.

For example, with a biopsy instrument (e.g., a needle, a knife, etc.) received through working channel 141 for use at the target treatment site A, the automated control of medical device 100 may minimize the risk of injury to the subject by automatically and precisely adjusting a position of distal end 144 in response to continuous movement of shaft 140. By way of further example, with a delivery instrument (e.g.

catheter) received through working channel 141 for delivering a medicament to the target treatment site A, the automated control of medical device 100 may improve the rate of delivering the medicament to the target treatment site A by automatically and precisely maintaining a position of distal end 144 at the first position.

While principles of this disclosure are described herein with reference to illustrative examples for particular applications, it should be understood that the disclosure is not limited thereto. Those having ordinary skill in the art and access to the teachings provided herein will recognize additional modifications, applications, and substitution of equivalents all fall within the scope of the examples described herein. Accordingly, the invention is not to be considered as limited by the foregoing description.

I claim:

1. A medical assembly, comprising:
    a medical device including:
        a handle having an actuator;
        a shaft extending distally from the handle, wherein a distal end of the shaft is coupled to the actuator by a wire extending through the shaft; and
        a sensor at the distal end of the shaft, the sensor is configured to measure data including a voltage corresponding to a measured electrical resistance indicative of an amount by which the distal end of the shaft has deflected relative to a proximal portion of the shaft after the distal end of the shaft moves from a first position to a second position;
    a drive mechanism configured to couple with the medical device at the actuator, wherein the actuator is configured to articulate the distal end of the shaft based on the data measured by the sensor to move the distal end from the second position to the first position; and
    a controller, wherein the controller is communicatively coupled to the sensor of the medical device and the drive mechanism, wherein the controller is configured to determine a distance between the first position and the second position based on the data measured by the sensor and to control the drive mechanism to actuate the distal end of the shaft by the distance.

2. The medical assembly of claim 1, wherein the drive mechanism includes a housing and one or more pins extending outwardly from the housing.

3. The medical assembly of claim 2, wherein the medical device includes one or more apertures positioned on the actuator, and wherein the actuator is configured to receive the one or more pins through the one or more apertures to couple the medical device to the drive mechanism.

4. The medical assembly of claim 3, wherein the drive mechanism includes a motor coupled to the one or more pins, and the drive mechanism is configured to rotate the actuator by movement of the one or more pins, upon activation of the motor.

5. The medical assembly of claim 4, wherein the actuator is a first actuator and the wire is a first wire, and wherein the handle includes a second actuator and the shaft includes a second wire.

6. The medical assembly of claim 5, wherein the distal end of the shaft is coupled to the second actuator by the second wire.

7. The medical assembly of claim 6, wherein the first actuator is configured to move a proximal portion of the distal end, and the second actuator is configured to move a distal portion of the distal end.

8. The medical assembly of claim 5, wherein the one or more pins includes a first pin configured to engage the first actuator, and a second pin configured to engage the second actuator; and
    wherein the motor includes a first motor coupled to the first pin, and configured to rotate the first pin relative to the handle upon activation, and the drive mechanism includes a second motor coupled to the second pin, and configured to rotate the second pin relative to the handle upon activation.

9. The medical assembly of claim 8, wherein the distal end includes an original configuration in the first position, and a modified configuration when in the second position, wherein the controller is configured to determine the modified configuration of the distal end based on the data measured by the sensor.

10. The medical assembly of claim 9, wherein the controller is configured to rotate at least one of the first pin or the second pin to move the corresponding proximal portion of the distal end or the distal portion of the distal end to return the distal end to the original configuration.

11. The medical assembly of claim 8, wherein the first pin is fixed to a first ring, wherein the second pin is fixed to a second ring, wherein the first ring, the second ring, the first actuator, and the second actuator are stacked.

12. The medical assembly of claim 2, wherein the controller is configured to actuate the actuator via movement of the one or more pins to articulate the distal end of the shaft by the distance determined based on the data measured by the sensor, thereby returning the distal end of the shaft to the first position.

13. The medical assembly of claim 1, wherein the electrical resistance increases as a body of the sensor bends with the distal end of the shaft.

14. The medical assembly of claim 1, wherein the sensor extends along a longitudinal length of the distal end of the shaft.

15. A medical assembly, comprising:
    a medical device including:
        a handle having a first actuator and a second actuator;
        a shaft extending distally from the handle, wherein a proximal portion of a distal end of the shaft is coupled to the first actuator by a first wire, wherein a distal portion of the distal end is coupled to the second actuator by a second wire, wherein the first actuator is configured to move the proximal portion of the distal end, and wherein the second actuator is configured to move the distal portion of the distal end; and
        a sensor at the distal end that is configured to measure data indicative of an extent to which the distal end has deflected from an original configuration, in which the distal end of the shaft has a first angle with respect to a proximal end of the shaft, to a modified configuration, in which the distal end of the shaft has a second angle with respect to the proximal end of the shaft, wherein the second angle differs from the first angle; and
    a drive mechanism configured to couple to the first actuator and the second actuator, wherein at least a portion of the drive mechanism is stacked with each of the first actuator and the second actuator,
    wherein at least one of the first actuator is configured to articulate the proximal portion of the distal end or the second actuator is configured to articulate the distal portion of the distal end, to move the distal end from the modified configuration to the original configuration, based on the data measured by the sensor.

16. The medical assembly of claim 15, wherein the drive mechanism includes:
- a first pin secured to a first ring, wherein the first pin is configured to engage the first actuator;
- a second pin secured to a second ring, wherein the first pin is configured to engage the second actuator;
- a first motor coupled to the first pin, and configured to rotate the first actuator relative to the handle upon activation; and
- a second motor coupled to the second pin, and configured to rotate the second actuator relative to the handle upon activation,
- wherein the first ring is stacked with the second ring.

17. The medical assembly of claim 16, further comprising a controller communicatively coupled to the sensor, the controller is configured to:
- determine the modified configuration of the distal end based on the data measured by the sensor; and
- rotate at least one of the first pin or the second pin to move the corresponding proximal portion or the distal portion of the distal end to return the distal end to the original configuration.

18. The medical assembly of claim 16, wherein the medical assembly further comprises a third actuator, and wherein the drive mechanism is configured to coupled to the third actuator, wherein a third pin is secured to a third ring, wherein the second ring is disposed between the first ring and the third ring.

19. A method for controlling a medical device, comprising:
- positioning a shaft of the medical device at a target site;
- coupling a first actuator of the medical device to a drive mechanism by inserting a first pin of the drive mechanism into the first actuator, wherein the first actuator is configured to control movement of the shaft in a first direction and in a second direction, opposite the first direction;
- coupling a second actuator of the medical device to the drive mechanism by inserting a second pin of the drive mechanism into the second actuator, wherein the second actuator is configured to control movement of the shaft in a third direction and a fourth direction, opposite the third direction;
- detecting a displacement of the shaft relative to the target site via a sensor of the medical device, wherein the sensor measures an amount that a distal portion of the shaft has bent; and
- activating a motor of the drive mechanism to rotate the pin and actuate the actuator, thereby moving the shaft by the displacement and toward the target site.

20. The method of claim 19, further comprising:
- coupling a third actuator of the medical device to the drive mechanism by inserting a third pin of the drive mechanism into the third actuator.

* * * * *